US012641506B2

(12) United States Patent
Zhi et al.

(10) Patent No.: US 12,641,506 B2
(45) Date of Patent: May 26, 2026

(54) METHOD AND DEVICE FOR NETWORK HANDOVER OF ACQUIRING STATUS INFORMATION OF A NETWORK AND NETWORK PREFERENCE INFORMATIONM, AND ELECTRONIC AND STORAGE MEDIUM FOR PERFORMING THE SAME

(71) Applicant: SAMSUNG ELECTRONICS CO., LTD., Suwon-si (KR)

(72) Inventors: Yajun Zhi, Xi'an (CN); Dong Xu, Xi'an (CN); HonLi Ge, Xi'an (CN); Xin Pan, Xi'an (CN); Ying Huang, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 298 days.

(21) Appl. No.: 18/295,200

(22) Filed: Apr. 3, 2023

(65) Prior Publication Data

US 2023/0362770 A1 Nov. 9, 2023

(30) Foreign Application Priority Data

May 5, 2022 (CN) .......................... 202210482338.X

(51) Int. Cl.
*H04W 36/14* (2009.01)
*H04W 36/30* (2009.01)
(52) U.S. Cl.
CPC .......... *H04W 36/14* (2013.01); *H04W 36/30* (2013.01)

(58) Field of Classification Search
CPC ................. H04W 36/14; H04W 36/30; H04W 36/008375; H04W 84/12; H04W 36/36
See application file for complete search history.

(56) References Cited

U.S. PATENT DOCUMENTS

| | | | |
|---|---|---|---|
| 7,499,432 B2* | 3/2009 | Guo .................. | H04W 36/0088 370/332 |
| 8,630,192 B2* | 1/2014 | Raleigh ............. | H04W 28/0268 370/252 |
| 8,848,608 B1* | 9/2014 | Addepalli ........... | H04L 43/0858 370/401 |
| 10,555,197 B2 | 2/2020 | Pao et al. | |
| 2006/0193295 A1* | 8/2006 | White ................... | H04W 88/06 370/336 |

(Continued)

FOREIGN PATENT DOCUMENTS

| | | |
|---|---|---|
| CN | 108391305 | 8/2018 |
| EP | 2962485 | 8/2019 |

(Continued)

OTHER PUBLICATIONS

US 10,523,661 B2, 12/2019, Zhong (withdrawn)

*Primary Examiner* — Wutchung Chu
(74) *Attorney, Agent, or Firm* — Morgan, Lewis & Bockius LLP

(57) ABSTRACT

A method for network handover includes acquiring status information of a current network and network preference information. It is determined whether the current network satisfies the acquired network preference information and the acquired status information. A network handover indication related to the current network is generated according to a result of the determination.

20 Claims, 9 Drawing Sheets

(56) References Cited

U.S. PATENT DOCUMENTS

| | | | | |
|---|---|---|---|---|
| 2006/0248083 | A1* | 11/2006 | Sack | G06F 21/6218 |
| | | | | 707/999.009 |
| 2009/0156220 | A1* | 6/2009 | Bae | H04W 36/302 |
| | | | | 455/443 |
| 2010/0228967 | A1* | 9/2010 | Hahn | H04W 12/062 |
| | | | | 713/155 |
| 2014/0080539 | A1* | 3/2014 | Scherzer | H04W 72/02 |
| | | | | 455/525 |
| 2014/0254550 | A1* | 9/2014 | Salvador | H04W 36/008375 |
| | | | | 370/331 |
| 2016/0191466 | A1* | 6/2016 | Pernicha | H04L 63/20 |
| | | | | 726/1 |
| 2017/0078922 | A1* | 3/2017 | Raleigh | H04L 69/18 |
| 2020/0037392 | A1 | 1/2020 | Qui et al. | |
| 2020/0107238 | A1 | 4/2020 | Silberstein et al. | |
| 2021/0120471 | A1* | 4/2021 | Choi | H04W 36/00837 |
| 2021/0289413 | A1* | 9/2021 | Files | H04W 4/027 |
| 2021/0392477 | A1* | 12/2021 | Taft | H04W 24/02 |
| 2022/0007150 | A1* | 1/2022 | Edge | H04W 64/00 |
| 2025/0203338 | A1* | 6/2025 | Henry | H04W 8/02 |
| 2025/0379767 | A1* | 12/2025 | Wong | H04L 25/0228 |

FOREIGN PATENT DOCUMENTS

| | | | | |
|---|---|---|---|---|
| KR | 20090066642 A | * | 6/2009 | H04W 36/14 |
| KR | 10-2012-0107236 | | 10/2012 | |
| KR | 10-2013-0053341 | | 5/2013 | |
| WO | WO 2013-182150 | | 12/2013 | |

* cited by examiner

FIG. 6

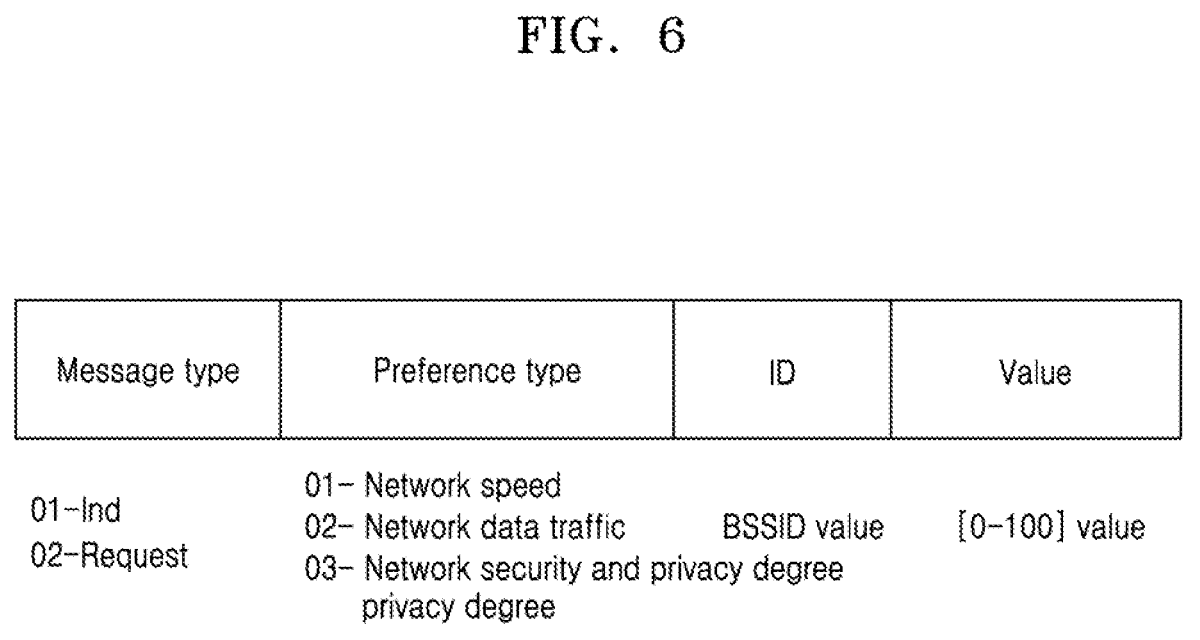

| Message type | Preference type | ID | Value |
|---|---|---|---|

01-Ind
02-Request

01- Network speed
02- Network data traffic
03- Network security and privacy degree
      privacy degree BSSID value

[0-100] value

METHOD AND DEVICE FOR NETWORK HANDOVER OF ACQUIRING STATUS INFORMATION OF A NETWORK AND NETWORK PREFERENCE INFORMATIONM, AND ELECTRONIC AND STORAGE MEDIUM FOR PERFORMING THE SAME

CROSS-REFERENCE TO RELATED APPLICATION

The present application claims priority under 35 U.S.C. § 119 to Chinese Patent Application No. 202210482338.X, filed on May 5, 2022, the entire contents of which are herein incorporated by reference.

TECHNICAL FIELD

The present disclosure relates to networking, and in particular, relates to a method and a device for network handover, an electronic apparatus and a storage medium.

DISCUSSION OF THE RELATED ART

Wireless network environments are established to permit devices to connect to a wireless local area network (WLAN). One particularly common technology used in establishing WLANs is Wi-Fi, which utilizes various IEEE 802.11 protocols. These Wi-Fi networks may employ multiple wireless access points (APs) and each of these Aps may have different data rates and may support different standards. In this case, a particular device on the WLAN may select an AP that best meets the user's needs for connection. Generally, a mobile apparatus calculates scores of the scanned APs and ranks them according to parameters such as received signal strength indicator (RSSI), frequency, and number of connections. Then, the AP with the highest score is selected for connection. During the network handover, the handover is often triggered according to these objective parameters.

SUMMARY

A method for network handover includes acquiring status information of a current network and network preference information. It is determined whether the current network satisfies the acquired network preference information and the acquired status information. A network handover indication is generated for the current network according to a result of the determination.

Acquiring the network preference information may include recording historical network related events and determining a preference threshold, according to the recorded historical network related events, for at least one attribute of the current network and a preference weight for the at least one attribute as the network preference information.

The at least one attribute may be a plurality of attributes, and the determining of the preference threshold, according to the recorded historical network related events, for the at least one attribute of the network and the preference weight for the at least one attribute, may include classifying the recorded historical network related events to determine that each recorded historical network related event is a network related event and determining which attribute of the plurality of attributes each recorded historical network related events relates to, calculating statistics for a number of the network related events related to each attribute of the plurality of attributes, and determining the preference threshold and the preference weight for each of the plurality of attributes, according to the calculated statistics.

The at least one attribute may include network speed, network data traffic, and/or a network security and privacy degree.

The method may further include monitoring a feedback event for the network handover indication and updating the network preference information according to the monitored feedback event. The feedback event may include an indicia of whether a handover event has occurred according to the network handover indication.

The at least one attribute may be a plurality of attributes. The determining of whether the current network satisfies the acquired network preference information and the acquired status information may include determining attribute values for the plurality of attributes of the current network according to the current network status information and the preference thresholds for the plurality of attributes of the network, and determining whether the current network satisfies the preference based on the attribute values of the plurality of attributes and the weights of the plurality of attributes.

The determining of whether the current network satisfies the preference based on the attribute values of the plurality of attributes and the weights of the plurality of attributes may include calculating an evaluation value relating to whether the current network satisfies the user preference by performing weighted summation on the attribute values of the plurality of attributes using the weights of the plurality of attributes, and determining whether the current network satisfies the preference according to the calculated evaluation value. The network handover indication may include the evaluation value.

The method may further include determining whether to hand over the current network according to the calculated evaluation value alone or according to the calculated evaluation value and an indicator for evaluating a quality of the current network, and in response to determining to hand over the current network, selecting a network to be handed over from among one or more candidate networks and handing over from the current network to the selected network.

The method may further include receiving a network handover command, and in response to receiving the network handover command, selecting a network to be handed over from among one or more candidate networks and handing over from the current network to the selected network.

The selecting of the network to be handed over from among the one or more candidate networks may include acquiring status information pertaining to the candidate networks and/or historical handover information related to the candidate networks, and selecting the network to be handed over from among the one or more candidate networks according to the acquired status information of the candidate networks and/or historical handover information related to the candidate networks.

The method may further include providing evaluation information for the current network when an evaluation request for the current network is received. The evaluation information may be determined according to the network preference information and the status information of the current network.

A device for network handover includes an information acquisition unit configured to acquire status information of a current network and network preference information. A network evaluation unit is configured to determine whether the current network satisfies the acquired network preference information and the acquired status information. An indication generation unit is configured to generate a network handover indication for the current network according to a result of the determination.

Acquiring the network preference information may include recording historical network related events, and determining a preference threshold, according to the recorded historical network related events, for at least one attribute of the current network and a preference weight for the at least one attribute as the network preference information.

The determining of the preference threshold, according to the recorded historical network related events, for the at least one attribute of the network and the preference weight for the at least one attribute, may include classifying the recorded historical network related events to determine that each recorded historical network related event is a network related event and determining which attribute of the plurality of attributes each recorded historical network related events relates to, calculating statistics for a number of the network related events related to each attribute of the plurality of attributes, and determining the preference threshold and the preference weight for each of the at least one attribute, according to the calculate statistics.

The at least one attribute may include network speed, remaining network data traffic, and/or a network security and privacy degree.

The device may further include a monitoring unit configured to monitor a feedback event for the network handover indication, and an updating unit configured to update the network preference information according to the monitored feedback event. The feedback event may include an indicia of whether a handover event has occurred according to the network handover indication.

The at least one attribute may be a plurality of attributes. The determining of whether the current network satisfies the acquired network preference information and the acquired status information may include determining attribute values for the plurality of attributes of the current network according to the current network status information and the preference thresholds for the plurality of attributes of the network, and determining whether the current network satisfies the preference based on the attribute values of the plurality of attributes and the weights of the plurality of attributes.

The determining of whether the current network satisfies the preference based on the attribute values of the plurality of attributes and the weights of the plurality of attributes may include calculating an evaluation value relating to whether the current network satisfies the user preference by performing weighted summation on the attribute values of the plurality of attributes using the weights of the plurality of attributes, and determining whether the current network satisfies the preference according to the calculated evaluation value. The network handover indication may include the evaluation value.

The device may further include a network handover unit configured to determine whether to hand over the current network according to the calculated evaluation value alone or according to the calculated evaluation value and an indicator for measuring a quality of the current network, and in response to determining to hand over the current network, select a network to be handed over from among one or more candidate networks and hand over from the current network to the selected network.

The device may further include a user input unit configured to receive a network handover command, and a network handover unit configured to, in response to receiving the network handover command, select a network to be handed over from among one or more candidate networks and hand over from the current network to the selected network.

The selecting of the network to be handed over from the candidate networks may include acquiring status information pertaining to the candidate networks and/or historical handover information related to the candidate networks, and selecting the network to be handed over from among the one or more candidate networks according to the acquired status information of the candidate networks and/or historical handover information related to the candidate networks.

The device may further include a network evaluation unit configured to provide evaluation information for the current network when an evaluation request for the current network is received. The evaluation information may be determined according to the network preference information and the status information of the current network.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein:

FIG. 6 is a schematic diagram illustrating a structure of an indication message according to an embodiment of the present disclosure;

DETAILED DESCRIPTION OF THE EMBODIMENTS

Figure 1:
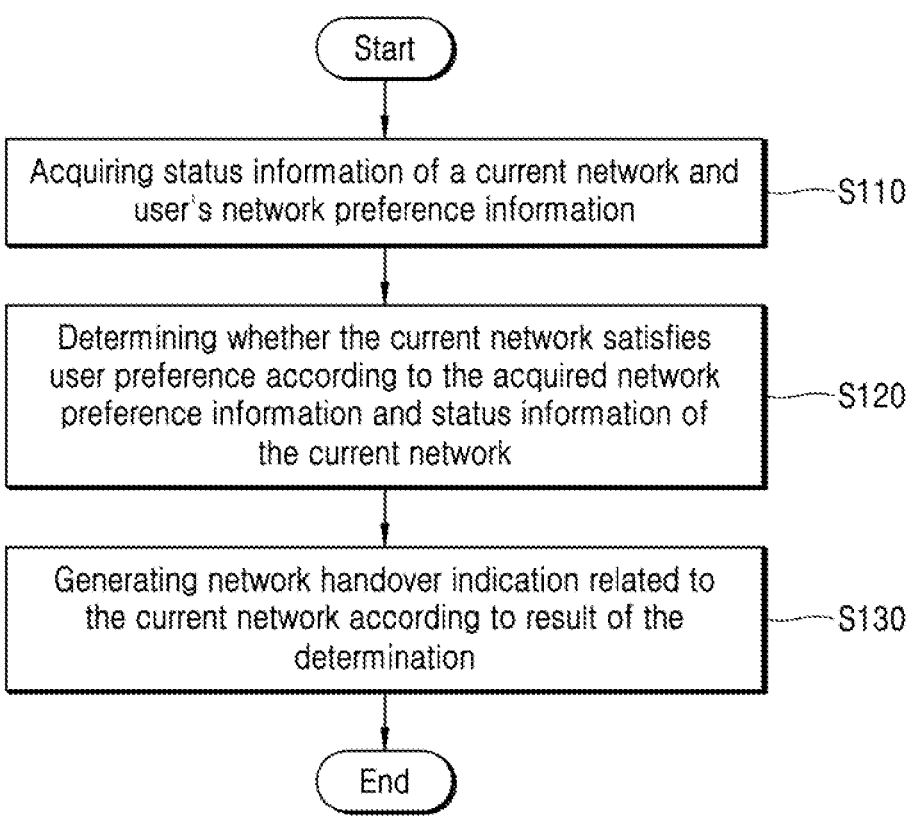
FIG. 1 is a flow chart illustrating a method for network handover according to an embodiment of the present disclosure.

In describing embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

It should be explained that terms "first", "second" and the like in the description and the claims as well as the drawings of the present disclosure are used to distinguish similar objects, and are not necessary to be used to describe specific order or sequence. It should be understood that the data used in this way can be interchanged under appropriate circumstances so that the embodiments of the present disclosure described herein can be implemented in an order other than those illustrated or described herein.

It should be explained here that "at least one of several items" appearing in the present disclosure means to include these three parallel situations of "any one of the several items", "a combination of any multiple of the several items", and "the totality of the several items". For example, "including at least one of A and B" for example includes the following three parallel situations: (1) including A; (2) including B; and (3) including A and B. For example, "executing at least one of step 1 and step 2" for example represents the following three parallel situations: (1) executing step 1; (2) executing step 2; and (3) executing step 1 and step 2.

FIG. 1 is a flow chart illustrating a method for network handover according to an embodiment of the present disclosure.

Referring to FIG. 1, status information of a current network and user's network preference information are acquired in step S110.

According to an embodiment, the status information of the current network may be any information related to status of the current network, for example, may be information related to at least one attribute of the current network. The user's network preference information may be acquired by the following method: recording user's historical network related events; and determining, according to the recorded historical network related events, a user's preference threshold for at least one attribute of the network and a preference weight for the at least one attribute as the user's network preference information. For example, the network related event may include a network selecting event, a network handover event and a network shutdown event etc. The at least one attribute of the network may include at least one of network speed, network data traffic, and a network security and privacy degree, but is not necessarily limited hereto.

According to an embodiment, the at least one attribute may be one attribute, or may be a plurality of attributes. In the case where the at least one attribute is the plurality of attributes, the user's preference threshold for the at least one attribute of the network and preference weight for the at least one attribute may be determined according to the recorded historical network related events, for example, by the following operations: classifying the recorded historical network related events to determine that each recorded historical network related event is a network related event related to which attribute of the plurality of attributes; recording/calculating statistics pertaining to the number of the network related events related to each attribute of the plurality of attributes; and determining the user's preference threshold and preference weight for the plurality of attributes according to statistical analysis of the number. For example, the preference thresholds and preference weights of the plurality of attributes may be initialized first, for example, a median of the preference thresholds of the majority of people for the plurality of attributes may be initially used as a user's initial preference threshold for the plurality of attributes, and the preference weights for the plurality of attributes can be set as a same value. Subsequently, the preference thresholds and preference weights of the plurality of attributes may be adjusted according to statistical analysis of the number of the network related events related to each attribute of the plurality of attributes. In addition, the at least one attribute may be only one attribute. In this case, statistics may be made on the number of the network related events related to the attribute to determine the user's preference threshold for the attribute, and since only one attribute is used, the preference weight of the attribute may be 1.

Figure 2:
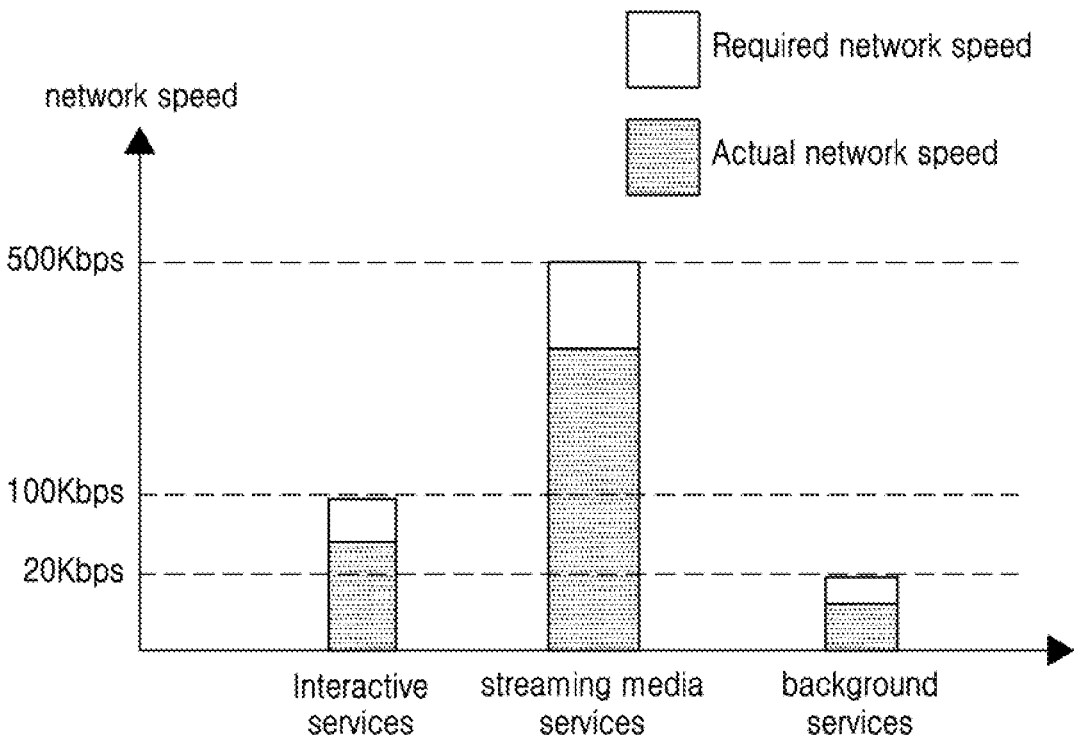
FIG. 2 is a schematic diagram illustrating recording historical network related events according to an embodiment of the present disclosure.

Hereinafter, a method of recording historical network related events according to an embodiment of the present disclosure is illustratively explained. For example, when the at least one attribute includes at least one of the network speed, the network data traffic, and the network security and privacy degree, the user's historical network related events may be divided into the following three types of events:

A Network speed type event (also referred to as a Speed type event) indicates an event that the link quality of the current network is relatively good, but the speed does not satisfy user service requirements, and the user selects a network. When different application services are running, maximum tolerance for the network speed of each user is not consistent, so that the network speeds when the user uses different services may be marked. FIG. 2 is a schematic diagram illustrating recording historical network related events according to an embodiment of the present disclosure. Referring to FIG. 2, for example, interactive services, streaming media services, and background services may be marked, respectively. In the case that the user manually performs network selection and handover when required network speed–actual network speed>threshold, this event may be recorded as a network related event related to the network speed.

A Network data traffic type event (also referred to as a Data Limit type event) indicates a degree to which the user protects data traffic, the more such events are triggered, the more the user wants to protect data traffic.

A Network security and privacy event (also referred to as a Security event) may indicate a degree of preference of the user for network security and privacy.

For example, when there is an event that in the case that a Wi-Fi network signal is good, but the network speed does not satisfy the requirement of the current service, user 1 manually hands over to a mobile network, it may be marked once that the user prefers the Speed.

For example, when there is an event that in the case that a Wi-Fi network signal is not good, user 2 attempts multiple connections including manually connecting to different Wi-Fi APs (e.g., in the same location), it may be marked that the user prefers Data Limit.

For example, when there is an event that there is an open network and a network quality is relatively good, and user 3 does not actively connect or actively disconnect the connection, it is marked that the Security is preferred.

After making statistics of the number of the above various types of events, the statistic number of the network related events related to each attribute of the plurality of attributes is analyzed to adjust the preference thresholds and preference weights of the plurality of attributes. For example, if the Speed events are increased, weights of the network speed may be increased, and the user's preference threshold for the network speed may be correspondingly reduced.

Referring back to FIG. 1, after the status information of the current network and the user's network preference information are acquired, whether the current network satisfies user preference may be determined according to the acquired network preference information and status information of the current network in step S120. For example, attribute values of the plurality of attributes of the current network may be determined according to the current network status information and the user's preference thresholds for the plurality of attributes of the network; and subsequently, whether the current network satisfies the user preference may be determined based on the attribute values of the plurality of attributes and the weights of the plurality of attributes. For example, an evaluation value on whether the current network satisfies the user preference is calculated by performing weighted summation on the attribute values of the plurality of attributes using the weights of the plurality of attributes, and whether the current network satisfies the user preference is determined according to the calculated evaluation value.

For example, the following table may be established for the current network to store the users and the attribute information of the current network (ID, Nt, D, S). Here, ID is identification information of the user, Nt, D and S are attribute values of these three attributes of the network speed, the network data traffic and the network security and privacy degree. Alternatively, other information (NA) may be further stored in the following tables. In addition, following Table 1 may be established for the network to which the user connects every time.

TABLE 1

| ID | $N_t$ | D | S | Other Info (optional) |
|---|---|---|---|---|
| $U_{ID1}$ | $X_{11}$ | $X_{12}$ | $X_{13}$ | NA |
| $U_{ID2}$ | $X_{21}$ | $X_{22}$ | $X_{23}$ | NA |
| $U_{ID3}$ | $X_{31}$ | $X_{32}$ | $X_{33}$ | NA |

In the above table, $N_t$ may represent a difference value between a network speed value at current time t and a network speed that the user can tolerate (e.g., the network speed preference threshold). The larger the value, the less the network meets the requirement of the user for network access speed. D may represent sensitivity of the user for data traffic. The smaller the value, the more the user is sensitive to the data traffic, and the user hopes to save the traffic. The larger the value, the less the user is sensitive to the data traffic. Variation of the value is related to a remaining status of the user data traffic. For example, the value may be a difference value between the current remaining data traffic and tolerable remaining data traffic (e.g., the network data traffic preference threshold) of the user. S may represent a network security and privacy degree. The larger the value, the less the requirements of the user prefers the network security and privacy are met. For example, the value may be determined according to the current network security and privacy situation and the network security and privacy degree that the user can tolerate (e.g., a preference threshold of the network security and privacy degree).

According to the above description, Simple Additive Weighting (SAW) for example may be adopted to calculate the evaluation value on whether the current network satisfies the user preference (e.g., also referred to as user preference decision utility value) U(A). The SAW algorithm is a method applicable for solving multi-attribute decision-making problems with little correlation. The larger the U(A) value, the less the current network satisfies the user's preference, and the higher the possibility for network handover. An expression is as follows:

$$U(A) = \sum_{j=1}^{N} \omega_j X_{ij}, i \in M$$

Where $X_{ij}$ represents a value of an attribute j of a network i, $\omega_j$ represents a preference weight of the attribute j, and U(A) represents a weighted sum of N attributes of the current network i.

After whether the current network satisfies the user preference is determined according to the acquired network preference information and status information of the current network, a network preference indication related to the current network may be generated according to a result of the determination. For example, a network handover indication related to the current network is generated when it is determined that the current network does not satisfy the user preference. For example, an indication message may be generated for the network that does not satisfy the user's preference. According to an embodiment, the network handover indication may include the above calculated evaluation value.

Figure 3:
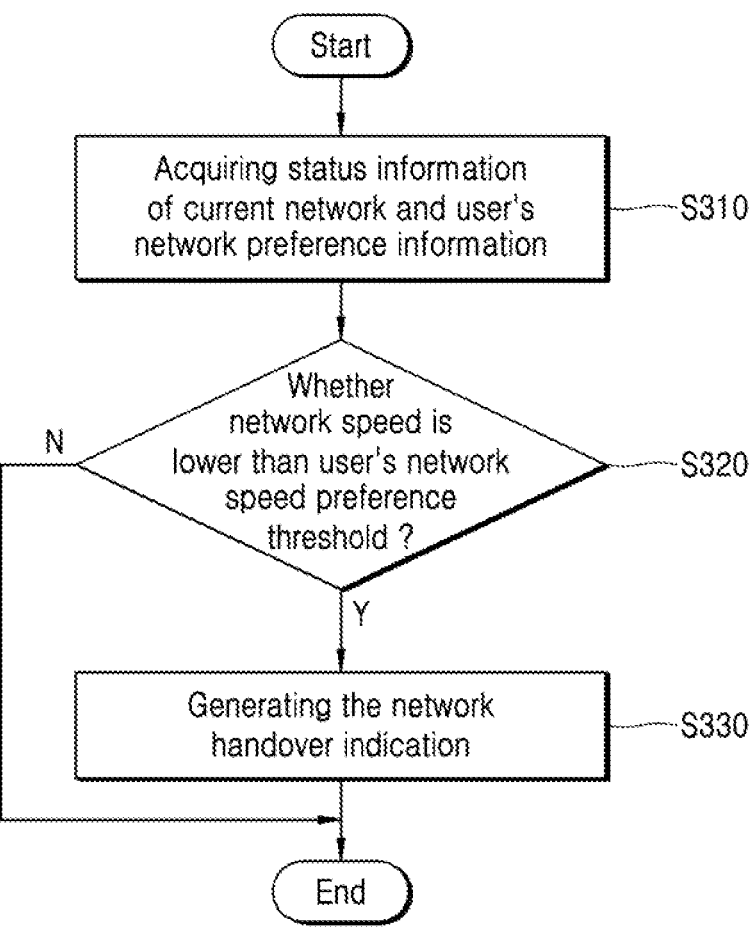
FIG. 3 is a flow chart illustrating an example of the method for the network handover according to an embodiment of the present disclosure.

Although in the above examples, the method for network handover according to an embodiment is described by taking the user's preference information including the preference thresholds and preference weights of the plurality of attributes of the network as an example, it should be explained that the attributes of the network for reflecting the user preference may be plural, or may be singular. For example, FIG. 3 is an example of the method for network handover according to an embodiment of the present disclosure. In this example, the preference threshold of the user for the network speed is only used as the user's network preference information. In this case, as shown in FIG. 3, the status information of the current network and a user's network speed preference threshold are acquired first (Step S310), and subsequently, whether the network speed of the current network is lower than the user's network speed preference threshold may be determined (Step S320). If the network speed of the current network is lower than the user's network speed preference threshold, it is determined that the current network does not satisfy the user preference. In this case, the network handover indication may be generated (Step S330).

According to an embodiment of the present disclosure, after the network preference indication related to the current network is generated, a user's feedback event for the network handover indication may further be monitored, and the user's network preference information is updated according to the monitored feedback event. Here, the feedback event includes the user handing over the current network or not handing over the current network according to the network handover indication. In addition, the updating of the user's network preference information may include updating the preference thresholds and preference weights for the plurality of attributes of the network. For example, if it is monitored that the user does not hand over the current network according to the network handover indication, this indicates that the previous determination does not conform to the user requirement or is not accurate enough, for example, the preference threshold for the network speed may be increased.

Figure 4:
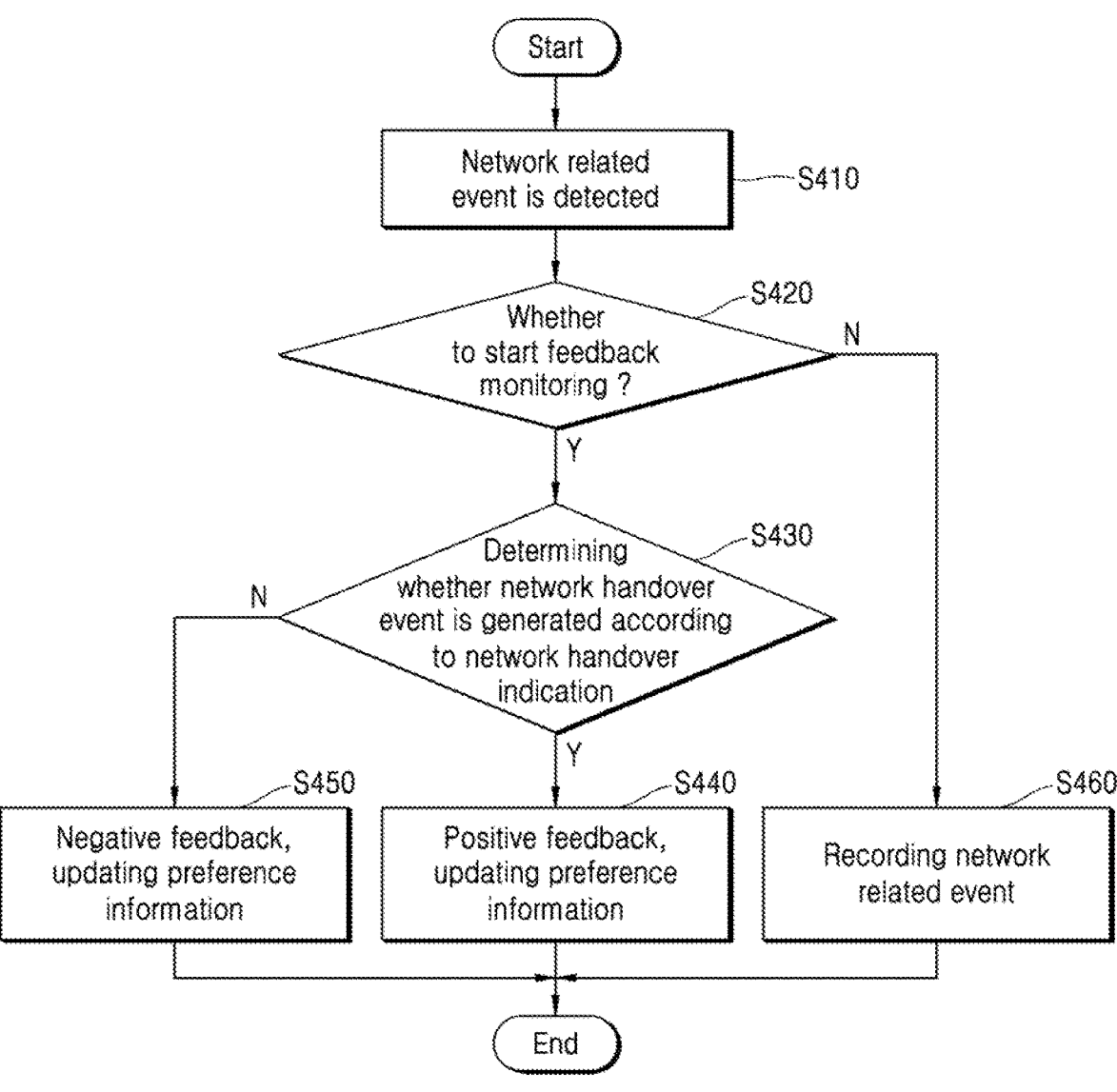
FIG. 4 is a flow chart illustrating a method of acquiring and updating user's network preference information according to an embodiment of the present disclosure.

FIG. 4 is a flow chart illustrating a method of acquiring and updating user's network preference information according to an embodiment of the present disclosure. As shown in FIG. 4, when the network related event is detected (Step S410), it may be determined whether to start feedback monitoring (Step S420). If feedback monitoring is started, it is determined whether the network handover event is generated according to the network handover indication (e.g., it is determined whether the user accepts the network handover indication) (Step S430). If it is determined that the network handover event is generated according to the network handover indication, the event is regarded as a positive feedback (Step S440), otherwise, the event is regarded as a negative feedback (Step S450), and the preference information may be correspondingly updated according to the feedback. If the feedback monitoring is not started, it is regarded that the detected network related event is not the network related event that is generated according to the network handover indication, the network related event is normally recorded (Step S460), and the preference thresholds and preference weights of the user for the network attributes are adjusted according to the statistic analysis of the events.

According to an embodiment of the present disclosure, the method for network handover as illustrated by FIG. 1 may further include receiving a network handover command from the user and in response to receiving the network handover command, selecting a network to be handed over from candidate networks and handing over from the current network to selected network. For example, the network handover command may be a command generated by the user according to the generated network handover indication, for example, the user clicks a menu for performing network handover and the like. The network to be handed over is selected from the candidate networks, when the network handover command of the user is received. For example, status information of the candidate networks and/ or historical handover information related to the candidate networks (also referred to as "jump status information") may be acquired, and the network to be handed over is selected from the candidate networks according to the acquired status information of the candidate networks and/or historical handover information related to the candidate networks. As an example, the historical handover information related to the candidate networks (such as candidate network IDs, number of jumps to candidate networks in history, possibility of jumping to the candidate network, and the like) may be determined according to attribute values of the plurality of attributes of the current network status and the current application as shown in following Table 2.

TABLE 2

|  | Interactive application | Video media application | Browser application |
|---|---|---|---|
| Current network status 1 | $NSD_{1\_1}$ | $NSD_{1\_2}$ | $NSD_{1\_3}$ |
| Current network status 2 | $NSD_{2\_1}$ | $NSD_{2\_2}$ | $NSD_{2\_3}$ |
| . . . | . . . | . . . | . . . |
| Current network status 3 | $NSD_{\_m\_1}$ | $NSD_{\_m\_1}$ | $NSD_{\_m\_3}$ |

In the above table, $NSD_{\_x\_x}$ represents jump status information under the current network status and the current application, for example, it may be shown in following Table 3:

| Candidate network status description (NSD) |
|---|
| Candidate network status ID |
| Number of jumps to candidate networks in history |
| Possibility of jumping to the candidate network |
| . . . |

For example, when WiFi speed becomes low (e.g., lower than the user's network speed preference threshold), the network handover indication may be generated, for example, this indicates that the current status does not satisfy the application, and the indication message is issued. When the network is handed over, next state description (NSD) information in the above table may be accessed, and the network to be handed over is determined according to this information.

According to an embodiment, the network to be handed over may be selected from the candidate networks only according to the historical handover information related to the candidate networks, or the network to be handed over may also be selected from the candidate networks according to the status information of the candidate networks (for example, whether the candidate network can satisfy the user's performance may be determined according to the status information of the candidate networks and the user's network preference information, and the network to be handed over is selected according to a result of the determination), or the network to be handover over may further be selected from the candidate networks by combining the historical handover information related to the candidate networks and the status information of the candidate networks.

According to an embodiment of the present disclosure, the method for network handover as illustrated by FIG. 1 may further include determining whether to hand over the current network according to the calculated evaluation value or according to the calculated evaluation value and an indicator for evaluating a quality of the current network and in response to determining to hand over the current network, selecting a network to be handed over from candidate networks and handing over from the current network to the selected network. For example, in an embodiment, the network handover may be automatically performed, and the performance of the network handover after the network handover command from the user is received may be omitted. In an embodiment, the network selection may be performed by using the above-described method of selecting the network to be handed over from the candidate networks.

In addition, according to an embodiment of the present disclosure, the method as illustrated by FIG. 1 may further include providing evaluation information for the current network when an evaluation request for the current network is received. Here, the evaluation information may be determined according to the user's network preference information and the status information of the current network. For example, the evaluation information may include the above-mentioned network handover indication, and the network handover indication may include the above-mentioned calculated evaluation value. Alternatively, the evaluation value may be further combined with other indicator for evaluating a quality of the current network (such as RSSI) to provide the evaluation information for the network.

In order to understand the method for the network handover according to an embodiment more clearly and succinctly, the method for the network handover is briefly described in conjunction with the example of FIG. 5 below.

Figure 5:
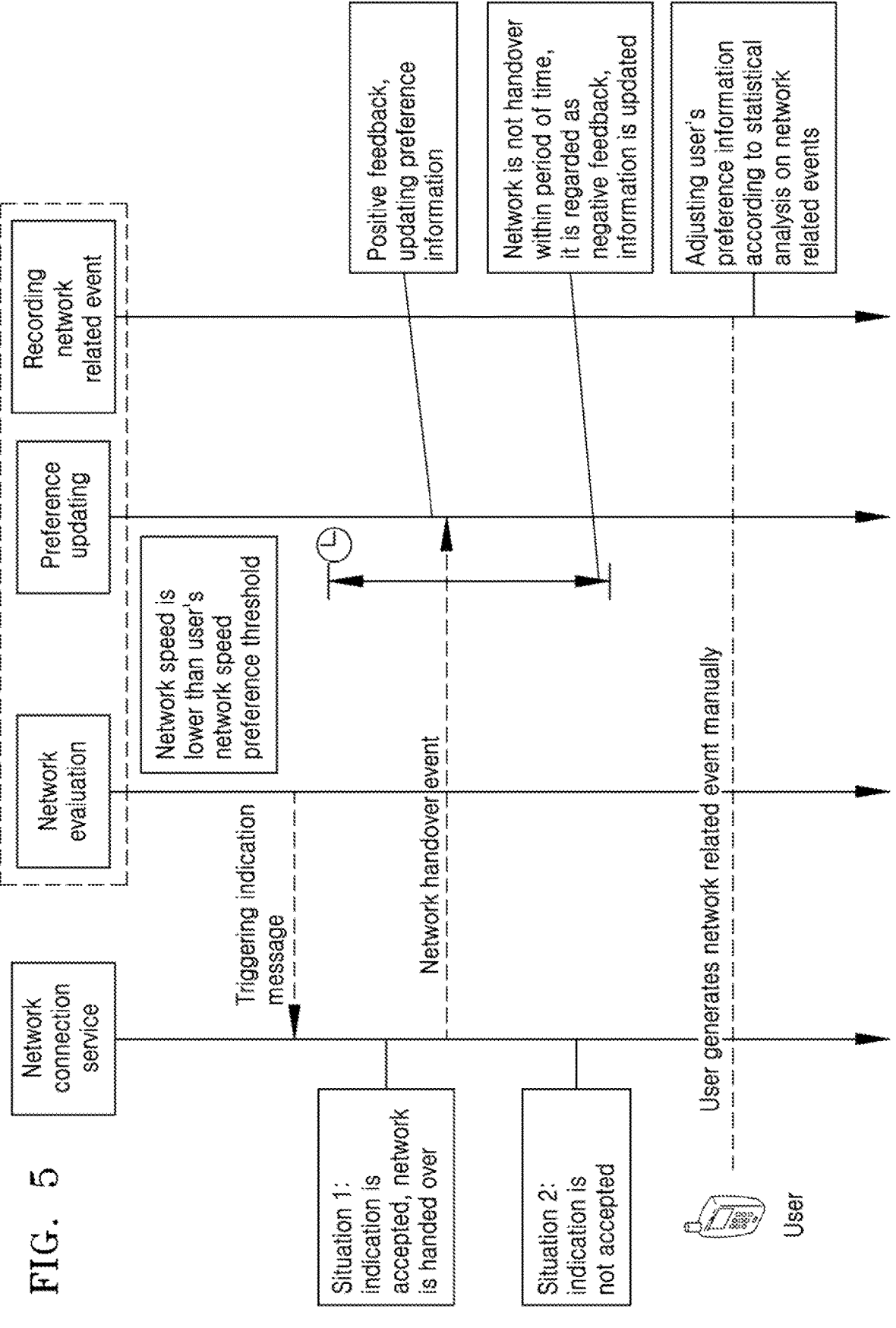
FIG. 5 is a schematic diagram illustrating an example of a method for the network handover according to an embodiment of the present disclosure.

FIG. 5 is a schematic diagram illustrating an example of the method for the network handover according to an embodiment of the present disclosure.

As shown in FIG. 5, when the network speed is lower than the user's network speed preference threshold, it may be determined that the current network does not satisfy the user preference. In this case, the network handover indication may be generated (for example, the indication message is triggered). In this case, there may be two situations, one situation (situation 1) is that the indication is accepted, for example, the network handover event is monitored during a period of time, and this indicates that the user hands over the network. The other situation (situation 2) is that the indication is not accepted, for example, the network handover event is not monitored during a period of time, and this indicates that the user does not select to hand over the network. In the case of situation 1, it indicates that the network handover event at this time is a positive feedback, and in the case of situation 2, it is a negative feedback. The user preference information may be correspondingly updated according to whether the positive feedback or the negative feedback is monitored. In addition to monitoring the feedback, the user may further manually execute some network related events. Whenever a network related event is generated, it may be recorded, and the user's network preference information may be adjusted according to the statistical analysis of the network related events, for example, the preference weights are updated.

A type of the triggered indication message may include two types, one type corresponds to an indication message that is generated actively, and the other type corresponds to an indication message that is generated passively, such as an indication message that is generated when a user's network evaluation request is received. A structure of the indication message is as shown in FIG. 6.

As shown in FIG. 6, the indication message may include a message type, a preference type, a network ID and an evaluation value. 01—Ind indicates that the message is an indication message that is generated actively, and 02—Request indicates that the message is an indication that is generated passively. The preference type for example may be 01—network speed, 02—network data traffic, and 03—network security and privacy degree. The network ID for example may be a basic service set ID (BSSID) value. The evaluation value for example may be a value with a range from 0 to 100.

Above, the network for network handover to various embodiments of the present disclosure has been described in conjunction with FIGS. 1 to 6. According to the above-described method, it is possible to facilitate the network handover according to the user's preference by determining whether the current network satisfies the user preference according to the acquired user's network preference information and the status information of the current network and generating the network handover indication related to the current network according to the determination result, thereby providing for a more desirable user experience.

Figure 7:
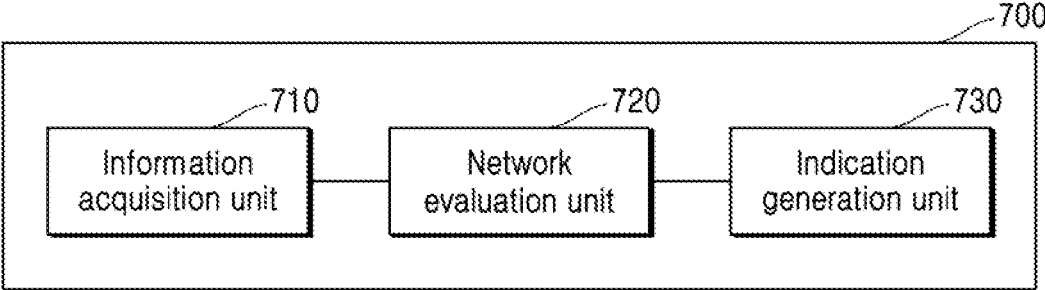
FIG. 7 is a block diagram illustrating a device for the network handover according to an embodiment of the present disclosure.

FIG. 7 is a block diagram illustrating a device 700 for the network handover according to an embodiment of the present disclosure.

Referring to FIG. 7, the device 700 may include an information acquisition unit 710, a network evaluation unit 720, and an indication generation unit 730. For example, the information acquisition unit 710 may acquire status information of a current network and user's network preference information. The network evaluation unit 720 may determine whether the current network satisfies user preference according to the acquired network preference information and status information of the current network. The indication generation unit 730 may generate a network handover indication related to the current network according to a result of the determination. In the foregoing text, the acquisition method of the user's network preference information and the details involved in the specific operations executed by the information acquisition unit 710, the network evaluation unit 720, and the indication generation unit 730 have been described, and it is to be understood that such a device 700 may be used in combination with the various methods and apparatuses described herein.

According to an embodiment of the present disclosure, the device 700 may further include a monitoring unit and an updating unit. The monitoring unit may monitor a user's feedback event for the network handover indication, and the updating unit may update the user's network preference information according to the monitored feedback event. The feedback event may include the user handing over the current network or not handing over the current network according to the network handover indication.

According to an embodiment of the present disclosure, the device 700 may further include a user input unit and a network handover unit. The user input unit may receive a network handover command from the user, and the network handover unit may, in response to receiving the network handover command, select a network to be handed over from candidate networks and hand over from the current network to the selected network. Alternatively, the network handover unit may also determine whether to hand over the current network according to the calculated evaluation value mentioned above or according to the calculated evaluation value and an indicator for evaluating a quality of the current network, and in response to determining to hand over the current network, select the network to be handed over from the candidate networks and hand over from the current network to the selected network.

According to an embodiment of the present disclosure, the device 700 may include a network evaluation unit. The network evaluation unit may provide evaluation information for the current network when an evaluation request for the current network is received. Here, the evaluation information may be determined according to the user's network preference information and the status information of the current network.

Regarding any related detail involved in the operations executed by the above-mentioned respective units, reference may be made to the corresponding description about FIGS. 1 to 6, which is provided above.

In addition, it should be explained that although the device 700 is divided into corresponding units for performing the corresponding processing when it is introduced above, those skilled in the art understand that the processing executed by the respective units may also be executed in the case where the device 700 is not specifically divided into the units or there is no distinct demarcation between the respective units. In addition, the device 700 may further include other units, such as a memory unit etc.

It is also to be understood that the various units may be embodied as one or more electronic circuits and also one or more of the aforementioned various units may be embodied as a single electronic circuit.

Figure 8:
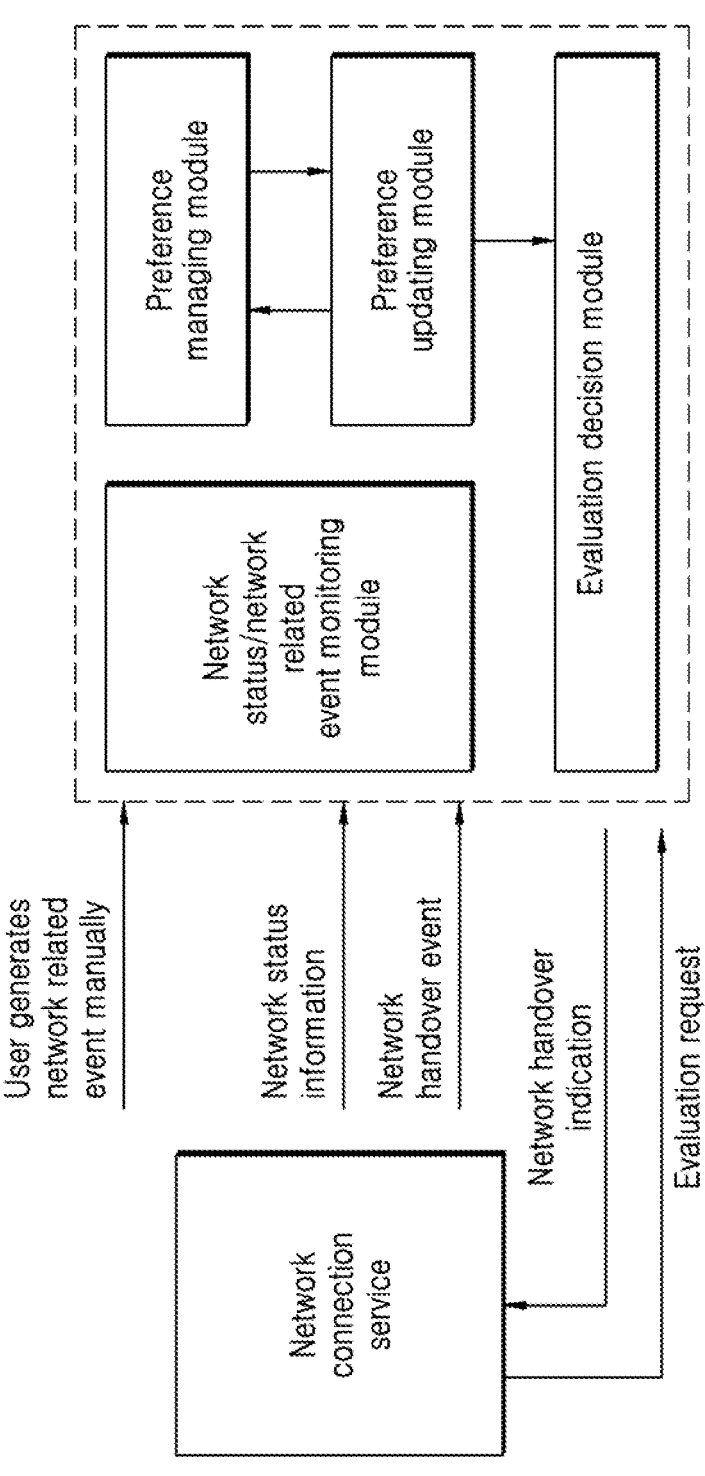
FIG. 8 is a schematic diagram illustrating operations of the device for the network handover according to an embodiment of the present disclosure.

FIG. 8 is a block diagram illustrating a device for network handover according to an embodiment of the present disclosure.

In an example of FIG. 8, the device 700 may be a user preference manager (UPM) as a handover decision engine module in a network connection service system of a terminal apparatus. The manager converts user's perception for the network into the network preference information according to monitoring the information of the user using network and the change of the network events, and provides the network handover indication and the network evaluation to a network connection service module. As shown in FIG. 8, the manager mainly includes a network status/network related event monitoring module, a preference managing module, a preference updating module and an evaluation decision module.

The monitoring module is responsible for acquiring the current network status and monitoring the network related events (such as network connection and handover events), and classifying the network related events, and indicating them to the preference managing module and the preference updating module respectively.

The preference managing module may record the network related events that are generated manually by the user (such as selecting Wi-Fi, handing over the network, shutting down WLAN and the like), dividing the events into categories, for example, dividing the user preference into three dimensions: Speed, Data Limits and Security, from the perspective of the user's perception for the network. In an initial stage, the preference of each user may be designated as a median preference value, and then different dimensions may be calibrated through the monitored network events.

The evaluation decision module may perform a simple weighting process on several unrelated attributes, obtain whether the network satisfies the user preference through the calculation using a weighting function, and generate the indication message for the network that does not satisfy the user preference to the network connection service module. Alternatively, when the network connection service module needs to acquire a tolerance index of the historical connection network, the evaluation decision module provides the evaluation information for the network, and the evaluation information may be data that represents whether the network satisfies the user preference.

After the indication message is generated by the UPM, the preference updating module may adjust the current network preference information according to the feedback event for the indication message. If this indication is accepted, it is regarded as a positive feedback, otherwise it is regarded as a negative feedback.

Above, the device for network handover according to various embodiments of the present disclosure has been described in conjunction with FIGS. 7 to 8. The above device may facilitate the network handover according to the user's preference, by determining whether the current network satisfies the user preference according to the acquired user's network preference information and the status information of the current network and generating the network handover indication related to the current network according to the determination result, thereby providing the user a more desirable experience.

Figure 9:
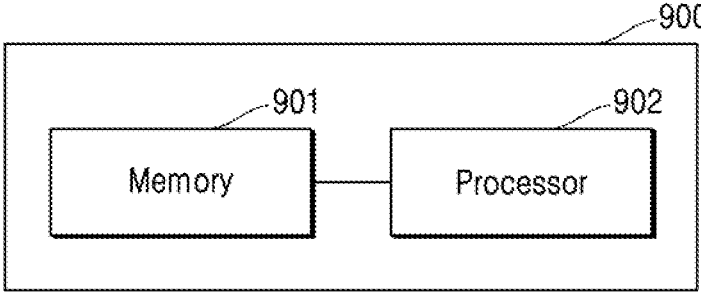
FIG. 9 is a block diagram illustrating an electronic apparatus according to an embodiment of the present disclosure.

FIG. 9 is a block diagram illustrating an electronic apparatus according to embodiments of the present disclosure.

Referring to FIG. 9, the electronic apparatus 900 may include at least one memory 901 and at least one processor 902. The at least one memory 901 stores computer executable indications, when executed by the at least one processor 902, which may cause the at least one processor 902 to execute the method according to an embodiment of the present disclosure.

As an example, the electronic apparatus 900 may be a PC computer, a tablet device, a personal digital assistant, a smart phone, or any other device capable of executing the above indication set (e.g., any electronic device that may connect to a wireless LAN). Here, the electronic apparatus does not have to be a single electronic apparatus, and may also be any aggregate of devices or circuits that can execute the above-mentioned indications (or indication sets) individually or jointly. The electronic apparatus may also be a part of an integrated control system or a system manager, or may be a portable electronic device configured to be interconnected with the local or remote (e.g., via wireless transmission) via interfaces.

In the electronic apparatus, the processor 902 may include a central processing unit (CPU), a graphics processing unit (GPU), a programmable logic device, a dedicated processor system, a microcontroller, or a microprocessor. As an example, the processor may also include an analog processor, a digital processor, a microprocessor, a multi-core processor, a processor array, a network processor, or the like.

The processor may run instructions or codes stored in the memory 901, wherein the memory 901 may also store data. Instructions and data may also be transmitted and received over a network via a network interface device, wherein the network interface device may use any known transmission protocol.

The memory 901 may be integrated with the processor 902, for example, RAM or flash memory is arranged in an integrated circuit microprocessor or the like. In addition, the memory 901 may include a separate device, such as an external disk drive, a storage array, or any other storage device that can be used by a database system. The memory 901 and the processor 902 may be operatively coupled, or may communicate with each other, for example, through an I/O port, a network connection or the like, so that the processor 902 can read files stored in the memory 901.

In addition, the electronic apparatus may also include a video display (such as a liquid crystal display) and a user interaction interface (such as a keyboard, a mouse, a touch input device, etc.). All components of the electronic apparatus may be connected to each other via a bus and/or a network.

According to embodiments of the present disclosure, a computer readable storage medium storing instructions is provided, wherein the instructions, when executed by at least one processor, cause the at least one processor to execute the method according to an embodiment of the present disclosure. Examples of the computer-readable storage medium here include: read only memory (ROM), random access programmable read only memory (PROM), electrically erasable programmable read only memory (EE-PROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, blu-ray or optical disc storage, hard disk drive (HDD), solid state drive (SSD), card storage (such as, multimedia cards, secure digital (SD) cards or extreme speed digital (XD) cards), magnetic tapes, floppy disks, magneto-optical data storage devices, optical data storage devices, hard disks, solid state disks, and any other devices that are configured to store computer programs and any associated data, data files and data structures in a non-transitory manner and provide the computer programs and any associated data, data files and data structures to the processor or computer so that the processor or computer can execute the computer programs. The instructions or computer programs in the above-mentioned computer-readable storage medium my run in an environment deployed in a computer apparatus such as a client, a host, a proxy device, a server, or the like. In addition, in one example, the computer program and any associated data, data files and data structures are distributed on networked computer systems, so that the computer programs and any associated data, data files and data structures are stored, accessed, and executed in a distributed manner through one or more processors or computers.

Those skilled in the art will appreciate that the disclosed embodiments may be modified from what has been described without departing from the scope of the present disclosure. The present application is intended to cover any modifications, uses, or adaptive changes of the present disclosure. These modifications, uses, or adaptive changes follow the general principles of the present disclosure.

What is claimed is:

1. A method for network handover, comprising:
acquiring status information of a current network and network preference information;
determining whether the current network satisfies the acquired network preference information based on the acquired status information of the current network; and
generating a network handover indication for the current network according to a result of the determination,
wherein the acquiring of the network preference information includes:
recording a user's historical network related events;
determining a preference weight for at least one attribute of a network as the network preference information, the at least one attribute including at least one of a network security and privacy degree; and
determining a preference threshold, according to the recorded user's historical network related events, for the at least one attribute of the network.

2. The method of claim 1, wherein, the acquiring of the network preference information further includes:
determining the preference threshold, according to the recorded historical network related events, for the at least one attribute of the network, and the preference weight for the at least one attribute as the network preference information.

3. The method of claim 2, wherein the at least one attribute is a plurality of attributes, and the determining of the preference threshold, according to the recorded historical network related events, for the at least one attribute of the network and the preference weight for the at least one attribute, comprises:
classifying the recorded historical network related events to determine which attribute of the plurality of attributes each recorded historical network related events relates to;
calculating statistics for a number of the network related events related to each attribute of the plurality of attributes; and
determining the preference threshold and the preference weight for each of the plurality of attributes, according to the calculated statistics.

4. The method of claim 2, wherein the at least one attribute further comprises network speed, and/or network data traffic.

5. The method of claim 1, further comprising:
monitoring a feedback event for the network handover indication; and
updating the network preference information according to the monitored feedback event,
wherein the feedback event comprises an indicia of whether a handover event has occurred according to the network handover indication.

6. The method of claim 2, wherein the at least one attribute is a plurality of attributes, wherein the determining of whether the current network satisfies the acquired network preference information and the acquired status information of the current network, comprises:
determining attribute values for the plurality of attributes of the current network according to the acquired status information of the current network and the preference thresholds for the plurality of attributes of the network; and
determining whether the current network satisfies the acquired network preference information based on the attribute values of the plurality of attributes and the weights of the plurality of attributes.

7. The method of claim 6, wherein the determining of whether the current network satisfies the network preference information based on the attribute values of the plurality of attributes and the weights of the plurality of attributes, comprises:
calculating an evaluation value relating to whether the current network satisfies the network preference information by performing weighted summation on the attribute values of the plurality of attributes using the weights of the plurality of attributes; and
determining whether the current network satisfies the network preference information according to the calculated evaluation value, wherein the network handover indication comprises the evaluation value.

8. The method of claim 7, further comprising:
determining whether to hand over the current network according to the calculated evaluation value alone or according to the calculated evaluation value and an indicator for evaluating a quality of the current network; and
in response to determining to hand over the current network, selecting a network to be handed over from among one or more candidate networks and handing over from the current network to the selected network.

9. The method of claim 1, further comprising:
receiving a network handover command; and
in response to receiving the network handover command, selecting a network to be handed over from among one or more candidate networks and handing over from the current network to the selected network.

10. The method of claim 8, wherein the selecting of the network to be handed over from among the one or more candidate networks comprises:
acquiring status information pertaining to the candidate networks and/or historical handover information related to the candidate networks, and selecting the network to be handed over from among the one or more candidate networks according to the acquired status information pertaining to the candidate networks and/or historical handover information related to the candidate networks.

11. The method of claim 1, further comprising:
providing evaluation information for the current network when an evaluation request for the current network is received, wherein the evaluation information is determined according to the network preference information and the acquired status information of the current network.

12. A device for network handover, comprising:
an information acquisition unit configured to acquire status information of a current network and network preference information;
a network evaluation unit configured to determine whether the current network satisfies the acquired network preference information based on the acquired status information of the current network; and
an indication generation unit configured to generate a network handover indication for the current network according to a result of the determination,
wherein the acquiring of the network preference information includes:
recording a user's historical network related events;
determining a preference weight for at least one attribute of a network as the network preference information, the at least one attribute including at least one of network speed, network data traffic, and/or a network security and privacy degree; and determining a preference threshold, according to the recorded user's historical network related events, for the at least one attribute of the network.

13. The device of claim 12, wherein the acquiring of the network preference information further includes:

determining the preference threshold, according to the recorded historical network related events, for the at least one attribute of the network, and the preference weight for the at least one attribute as the network preference information.

14. The device of claim 13, wherein the determining of the preference threshold, according to the recorded historical network related events, for the at least one attribute and the preference weight for the at least one attribute, comprises:

classifying the recorded historical network related events to determine which attribute of the plurality of attributes each recorded historical network related events relates to;

calculating statistics for a number of the network related events related to each attribute of the plurality of attributes; and determining the preference threshold and the preference weight for each of the at least one attribute, according to the calculate statistics.

15. The device of claim 13, wherein the at least one attribute further comprises network speed, and/or remaining network data traffic.

16. The device of claim 12, further comprising:

a monitoring unit configured to monitor a feedback event for the network handover indication; and an updating unit configured to update the network preference information according to the monitored feedback event, wherein the feedback event comprises an indicia of whether a handover event has occurred according to the network handover indication.

17. The device of claim 13, wherein the at least one attribute is a plurality of attributes, wherein the determining of whether the current network satisfies the acquired network preference information based on the acquired status information of the current network, comprises:

determining attribute values for the plurality of attributes of the current network according to the acquired status information of the current network and the preference thresholds for the plurality of attributes of the network; and determining whether the current network satisfies the network preference information based on the attribute values of the plurality of attributes and the weights of the plurality of attributes.

18. The device of claim 17, wherein the determining of whether the current network satisfies the network preference information based on the attribute values of the plurality of attributes and the weights of the plurality of attributes, comprises:

calculating an evaluation value relating to whether the current network satisfies the network preference information by performing weighted summation on the attribute values of the plurality of attributes using the weights of the plurality of attributes; and determining whether the current network satisfies the network preference information according to the calculated evaluation value, wherein the network handover indication comprises the evaluation value.

19. The device of claim 18, further comprising:

a network handover unit configured to:

determine whether to hand over the current network according to the calculated evaluation value alone or according to the calculated evaluation value and an indicator for measuring a quality of the current network; and in response to determining to hand over the current network, select a network to be handed over from among one or more candidate networks and hand over from the current network to the selected network.

20. The device of claim 12, further comprising:

a user input unit configured to receive a network handover command; and a network handover unit configured to, in response to receiving the network handover command, select a network to be handed over from among one or more candidate networks and hand over from the current network to the selected network.

\* \* \* \* \*